(12) United States Patent
Kurane

(10) Patent No.: US 7,511,752 B2
(45) Date of Patent: Mar. 31, 2009

(54) IMAGING DEVICE AND IMAGING APPARATUS WITH RESET UNIT THAT RESETS PLURAL LINES SIMULTANEOUSLY

(75) Inventor: Haruhisa Kurane, Suwa (JP)

(73) Assignee: Seiko Epson Corporation (JP)

( * ) Notice: Subject to any disclaimer, the term of this patent is extended or adjusted under 35 U.S.C. 154(b) by 579 days.

(21) Appl. No.: 11/248,116

(22) Filed: Oct. 12, 2005

(65) Prior Publication Data

US 2006/0109373 A1 May 25, 2006

(30) Foreign Application Priority Data

Nov. 22, 2004 (JP) ............................. 2004-336989

(51) Int. Cl.
*H04N 3/15* (2006.01)
*H04N 5/335* (2006.01)
*H04N 5/225* (2006.01)
*H01L 27/00* (2006.01)

(52) U.S. Cl. .................... 348/296; 348/218.1; 348/302; 250/208.1

(58) Field of Classification Search ............. 348/218.1, 348/296, 302; 250/208.1
See application file for complete search history.

(56) References Cited

U.S. PATENT DOCUMENTS

| | | | |
|---|---|---|---|
| 6,809,766 B1 * | 10/2004 | Krymski et al. | ............. 348/296 |
| 7,057,655 B1 | 6/2006 | Masuyama | |
| 2003/0117386 A1 | 6/2003 | Mabuchi | |
| 2005/0007460 A1 * | 1/2005 | Stavely et al. | ............ 348/222.1 |
| 2006/0044413 A1 * | 3/2006 | Krymski | ................. 348/230.1 |
| 2006/0197858 A1 | 9/2006 | Masuyama | |
| 2006/0238632 A1 * | 10/2006 | Shah | ......................... 348/296 |

FOREIGN PATENT DOCUMENTS

| | | |
|---|---|---|
| JP | 2000-125203 | 4/2000 |
| JP | 2001-268451 | 9/2001 |
| JP | 2003-198948 | 7/2003 |

* cited by examiner

*Primary Examiner*—John M Villecco
(74) *Attorney, Agent, or Firm*—Harness, Dickey & Pierce, P.L.C.

(57) ABSTRACT

An imaging device that realizes a rolling shutter by performing reset, exposure, and read-out for respective lines sequentially, the imaging device including a reset unit that resets plural lines simultaneously.

6 Claims, 10 Drawing Sheets

IMAGING DEVICE AND IMAGING APPARATUS WITH RESET UNIT THAT RESETS PLURAL LINES SIMULTANEOUSLY

RELATED APPLICATIONS

This application claims priority to Japanese Patent Application No. 2004-336989 filed Nov. 22, 2004 which is hereby expressly incorporated by reference herein in its entirety.

BACKGROUND OF THE INVENTION

1. Field of the Invention

The present invention relates to an imaging apparatus that obtains an image with a wide dynamic range on the basis of an image that has been imaged with standard exposure time and an image that has been imaged with short exposure time and an imaging device suitable for the imaging apparatus.

2. Description of the Related Art

As an imaging apparatus using an imaging device of this type, there is an imaging apparatus that generates an image with a wide dynamic range by imaging images with two kinds of exposure time (standard exposure time and short exposure time) in one frame period and replacing pixels with a maximum luminance value in the image that has been imaged with the standard exposure time with pixels in the image that has been imaged with the short exposure time (see, for example, JP-A-2003-198948).

In the imaging device for the imaging apparatus in JP-A-2003-198948, first, respective lines (pixel arrays) are sequentially reset from an upper side to a lower side in a plan view and charges are read out from the reset pixel arrays sequentially from one for which the standard exposure time has elapsed. The pixel arrays, from which charges have been read out, are reset sequentially from one for which predetermined time has elapsed. Charges are read out from the reset pixel arrays sequentially from one for which the short exposure time has elapsed. The imaging device realizes a rolling shutter in which the pixel arrays, from which charges after the standard exposure time are read out, the pixel arrays, for which a reset operation after the predetermined time is executed, and the pixel arrays, from which charges after the short exposure time are read out, move sequentially.

However, in the imaging device in the past, since the respective pixel arrays are simply reset sequentially, only the same short exposure time can be set for all the pixel arrays. Therefore, for example, in imaging a subject with high contrast, when the short exposure time is set short such that charges accumulated in the imaging device do not saturate, it is likely that a S/N ratio of charges (image signals), which are read out from the imaging device in a dark part with a small amount of incident light, deteriorate more than necessary. When the short exposure time is set long, image signals outputted from the imaging device saturate even in a bright part with a large amount of incident light. Thus, it is likely that, even if the pixels are replaced, an image to be generated does not have a wide dynamic range.

SUMMARY

An advantage of the invention is to solve the unsolved problems in the past and provide an imaging device and an imaging apparatus that can set an exposure time for each line.

In order to solve the problems, an imaging device according to a first aspect of the invention is an imaging device that realizes a rolling shutter by performing reset, exposure, and read-out for respective lines sequentially. The imaging device includes a reset unit that resets plural lines simultaneously.

According to a second aspect of the invention, in the imaging device according to the first aspect of the invention, the reset unit may include: a line specifying unit that specifies the plural lines; and a reset control unit that controls reset for the specified lines on the basis of a control signal indicating whether the specified lines should be reset.

According to a third aspect of the invention, in the imaging device according to the second aspect of the invention, the line specifying unit may include: a free-running counter that specifies the respective lines sequentially; a first line specifying unit that specifies a first line on the basis of a line specified by the free-running counter and a first offset amount for setting a first exposure time; and a second line specifying unit that specifies a second line on the basis of the line specified by the free-running counter and a second offset amount for setting a second exposure time shorter than the first exposure time.

According to a fourth aspect of the invention, in the imaging device according to the second aspect of the invention, when the reset control unit does not reset the lines specified by the line specifying unit, the reset control unit may reset lines not forming an image instead of the lines not to be reset. As the lines not forming an image, for example, there are lines shielded for dark current correction.

According to a fifth aspect of the invention, in the imaging device according to the second aspect of the invention, the imaging device may further include: a readout line specifying unit that specifies at least one line; a readout control unit that controls readout of the specified lines; and an immediate reset unit that resets only lines, for which the readout is performed, among the specified lines immediately after the readout.

According to a sixth aspect of the invention, in the imaging device according to the second aspect of the invention, the imaging device may further include a control signal receiving unit that acquires the control signal transmitted to the own device. The reset control unit may control reset of the lines specified by the line specifying unit on the basis of the acquired control signal.

According to this constitution, the reset timing can be set for each line of the imaging device. For example, unlike a method of simply resetting lines one by one sequentially from an upper side in a plan view to set the same exposure time for all lines, it is possible to set an appropriate length of exposure time for each line.

An imaging apparatus according to a seventh aspect of the invention is an imaging apparatus including the imaging device according to the sixth aspect of the invention. The imaging apparatus includes: a control signal generating unit that evaluates (detects) a luminance value (a saturation state) of respective lines in an image, which is imaged by the imaging device, for each of the lines and generates the control signal on the basis of a result of the evaluation; and a control signal transmitting unit that causes the imaging device to acquire the generated control signal.

According to an eighth aspect of the invention, in the imaging apparatus according to the seventh aspect of the invention, the control signal generating unit may include: a code storing unit that stores codes indicating exposure time of the respective lines of the imaging device; a reset line specifying unit that specifies a line for which reset can be executed; a signal generating unit that reads out codes indicating exposure time of the lines specified by the line specifying unit and generates the control signal on the basis of the read-out code; and a code updating unit that evaluates (detects) a luminance value (a saturation state) of an image, which is imaged by the imaging device, on the basis of the generated control signal and updates the codes of the respective lines stored in the storing unit on the basis of a result of the evaluation.

An imaging apparatus according to a ninth aspect of the invention is an imaging apparatus that generates an imaged image by imaging a first image with standard exposure time in one frame period and imaging a second image with short exposure time shorter than the standard exposure time and replacing saturated pixels having a maximum luminance value in the first image with pixels in the second image. The imaging apparatus may include: the imaging device according to any one of the first to the fifth aspects of the invention that images the first image and the second image; and a short exposure time setting unit that sets, on the basis of a saturation state of respective lines in the second image that has been imaged by the imaging device in a preceding frame period, a length of the short exposure time in a subsequent frame period for each of the lines.

According to this constitution, when there is no saturated pixel in a predetermined line (pixel array) in an image that has been imaged with the short exposure time in a preceding frame period, the short exposure time in the pixel array is set long. When there are 10% or more saturated pixels in the pixel array, the short exposure time in the pixel array is set short. Consequently, it is possible to improve a S/N ratio for each of the pixel arrays and reduce the number of saturated pixels in an image to be imaged with the short exposure time in a subsequent frame period. Therefore, by replacing pixels with a maximum luminance value in an image that has been imaged with the standard exposure time with pixels in an image that has been imaged with the set short exposure time, it is possible to generate an image with a wider dynamic range and a higher S/N ratio, for example, compared with a method of executing the replacement using an image that has been imaged with the same short exposure time in all areas.

BRIEF DESCRIPTION OF THE DRAWINGS

The invention will be described with reference to the accompanying drawings, wherein like numbers reference like elements, and wherein.

DESCRIPTION OF THE EMBODIMENTS

An embodiment of an imaging device and an imaging apparatus of the invention will now be explained with reference to the accompanying drawings.

Figure 1:
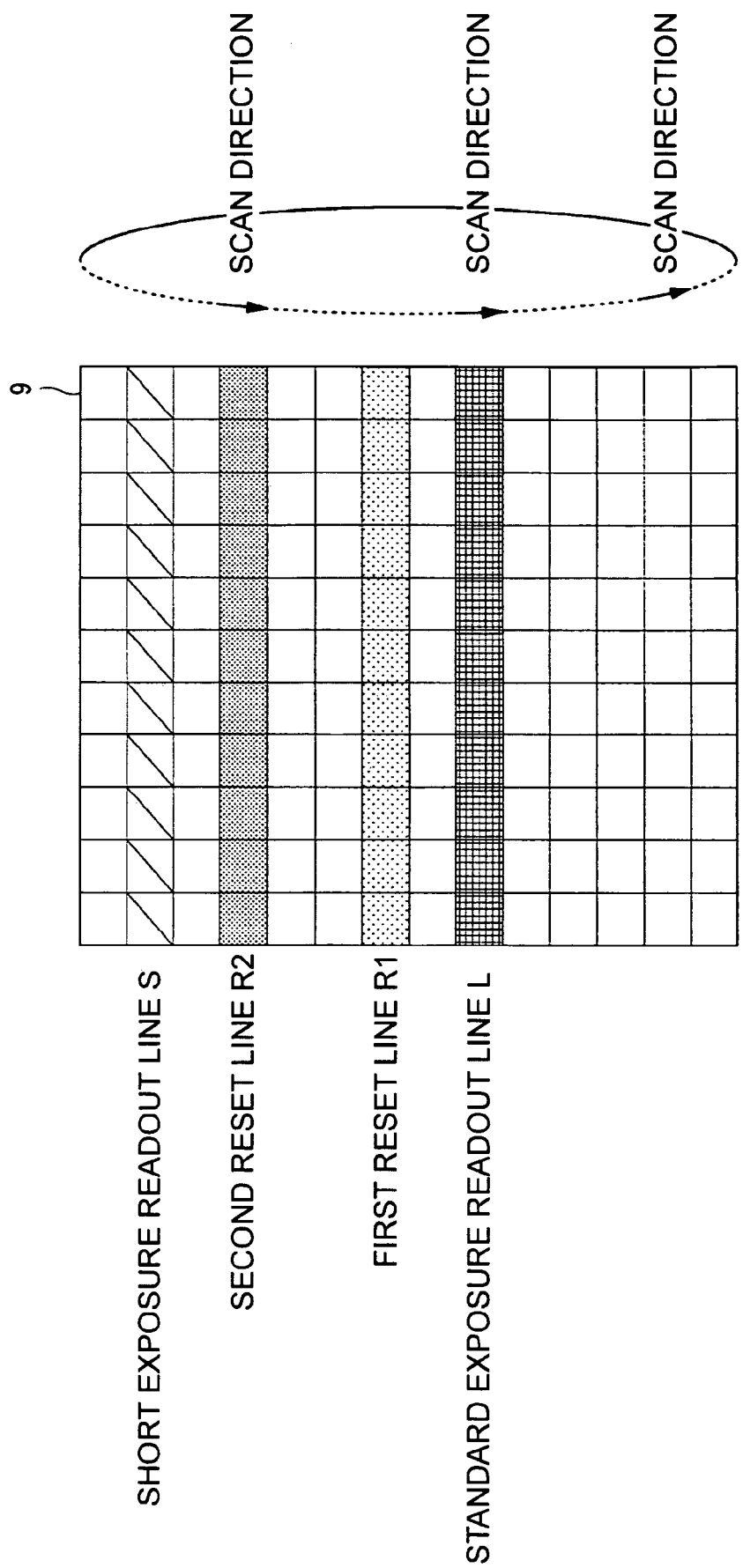
FIG. 1 is a diagram for explaining pixel arrays moving in rolling shutter.

An imaging apparatus 1 includes an imaging device that images an image with two kinds of exposure time (standard exposure time and short exposure time) in one frame period. The imaging device executes processing for resetting respective lines (pixel arrays) sequentially from an upper side to a lower side in a plan view and processing for reading out charges sequentially from a pixel array for which predetermined exposure time has elapsed after reset simultaneously (note that "reset" and "readout" are executed for separate line numbers). Specifically, as shown in FIG. 1, the imaging device resets a pixel array (line) for which first predetermined time has elapsed or a pixel array (line) for which second predetermined time has elapsed from a pixel array for which readout of charges is finished after elapse of the standard exposure time. Separately from the standard exposure readout, the imaging device reads out charges sequentially from a pixel array (line) for which third predetermined time has elapsed from the reset (short exposure time readout). In short, the imaging device realizes a rolling shutter in which, as shown in FIG. 1, a pixel array from which charges are read out after the standard exposure time (hereinafter also referred to as "standard exposure readout line L"), a pixel array for which a reset operation is executed after the first predetermined time (hereinafter also referred to as "first reset line R1"), a pixel array for which a reset operation is executed after the second predetermined time (hereinafter also referred to as "second reset line R2"), and a pixel array from which charges are read out after the short exposure time (the third predetermined time) (hereinafter also referred to as "short exposure readout line S") move sequentially. Consequently, the imaging device resets two pixel arrays selected on a first reset line R1 and a second reset line R2 simultaneously. Note that, in this embodiment, the standard exposure time is time, immediately after the short exposure time readout is executed, until the next readout is performed after reset is executed. The short exposure time is time until the next readout is performed after reset on the first reset line R1 or the second reset line R2 is executed.

In the imaging apparatus 1, it is possible to obtain an image with a wide dynamic range by replacing pixels with a saturated luminance value (a maximum value of an output gradation) in an image that has been imaged with the standard exposure time with corresponding pixels in an image that has been imaged with the short exposure time.

In that case, the imaging apparatus 1 evaluates the magnitudes of luminance values (brightness) of the images imaged with the short exposure time and the standard exposure time in the preceding frame period for each of the pixel arrays and sets the short exposure time and the standard exposure time in the subsequent frame period for each of the pixel arrays on the basis of a result of the evaluation. In other words, when there is a part where pixels are saturated in the short exposure time, the imaging apparatus 1 performs control for reducing the short exposure time of a pixel array including that part. Note that, as a method of evaluating brightness, there is a method of setting a sum of pixels with luminance values saturated in an image that has been imaged with the short exposure time as an evaluation value for each pixel array. As a method of controlling exposure time, there is a method of reducing the short exposure time of a pixel array with the evaluation value equal to or higher than a predetermined value (e.g., 10%) and extending the short exposure time of a pixel array with the evaluation value (the sum of saturated pixels) equal to zero.

Configurations of the Imaging Apparatus

Figure 2:
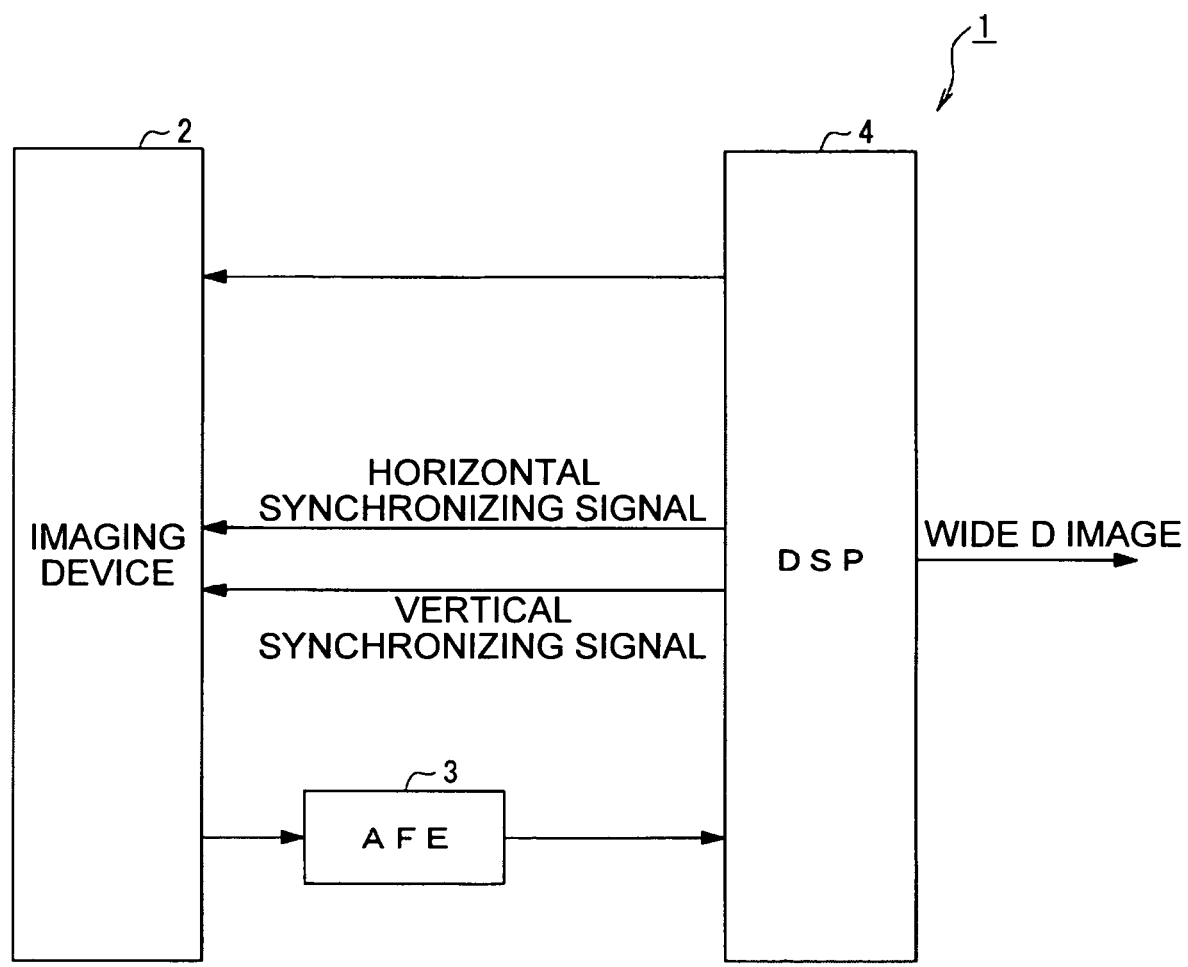
FIG. 2 is a block diagram of a schematic constitution of an imaging apparatus to which an imaging device is applied.

FIG. 2 is a block diagram of an internal constitution of an embodiment of the imaging apparatus of the invention. As shown in FIG. 2, the imaging apparatus 1 includes an imaging device 2, an Analog Front End (AFE) 3, and a Digital Signal Processor (DSP) 4.

Configurations of the imaging apparatus of the invention will now be explained.

Figure 3:
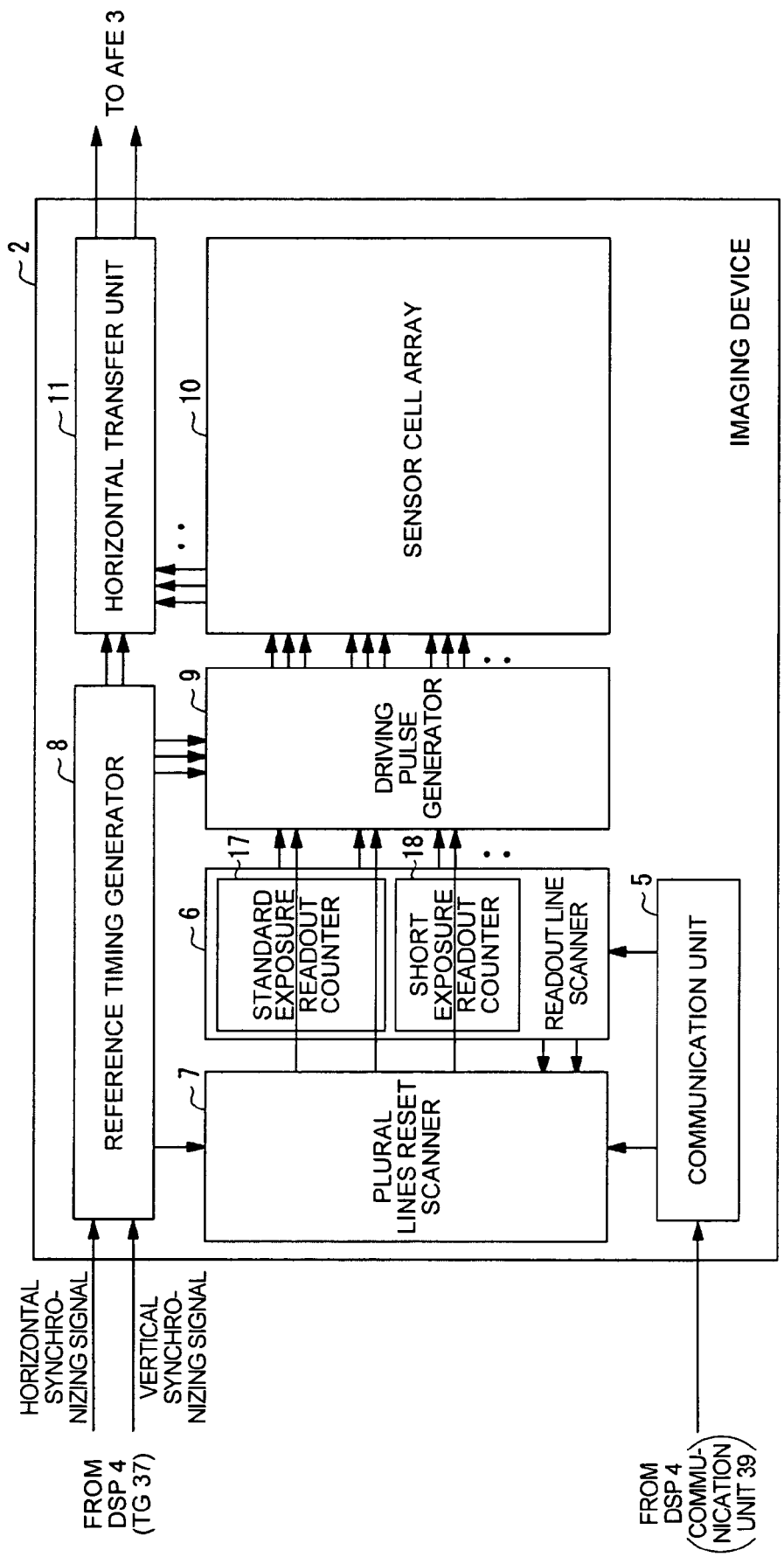
FIG. 3 is a block diagram of an internal constitution of the imaging device in FIG. 2.

As shown in FIG. 3, the imaging device 2 includes a communication unit (reception) 5, a readout line scanner 6, a plural lines reset scanner 7, a reference timing generator 8, a driving pulse generator 9, a sensor cell array 10, and a horizontal transfer unit 11.

Figure 4:
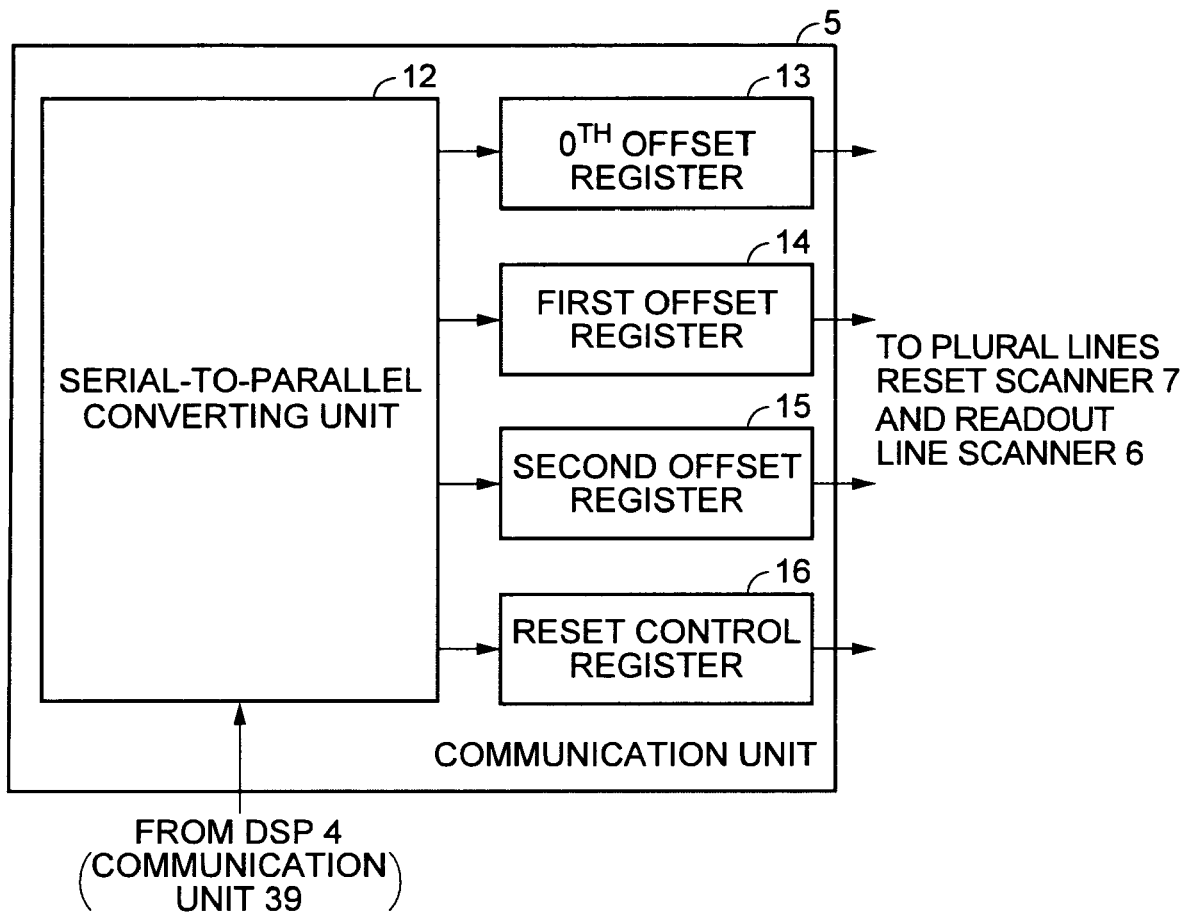
FIG. 4 is a block diagram of an internal constitution of a communication unit in FIG. 3.

As shown in FIG. 4, the communication unit (reception) 5 converts serial communication data transmitted from a communication unit (transmission) 39 (described later) of the DSP 4 into parallel data (a phase difference between a value of a standard exposure readout counter 17 (described later) and a value of a short exposure readout counter 18 (described later) (a $0^{th}$ offset amount), a first offset amount of a row number of the first reset line R1 with respect to a short exposure readout line, a second offset amount of a row number of the second reset line R2 with respect to the short exposure readout line, and a control bit (described later) indicating whether a reset operation is executed in the first reset line R1 and the second reset line R2). The communication unit (reception) 5 outputs the converted parallel data to a $0^{th}$ offset resister 13, a first offset register 14, a second offset register 15, and a reset control register 16. The registers 13 to 16 hold the $0^{th}$ to the second offset amounts and the control bit and output the offset amounts and the control bit to the readout line scanner 6 and the plural lines reset scanner 7. The $0^{th}$ offset register 13 is a register that holds the $0^{th}$ offset amount. The first offset register 14 is a register that holds the first offset amount. The second offset register 15 is a register that holds the second offset amount.

The reset control register 16 is a register that holds the control bit. In this embodiment, it is assumed that the control bit is 2 bit data, which is provisionally set to ($C_{R2}$, $C_{R1}$). The respective bits $C_{R2}$ and $C_{R1}$ have independent functions. $C_{R1}$ is a bit for controlling execution/non-execution of reset for the first reset line R1. Similarly, $C_{R2}$ is a bit for controlling execution/non-execution of the second reset line R2. When the control bit is (1, 0), a reset operation is executed only in the second reset line R2. When the control bit is (0, 1), a reset operation is executed only in the first reset line R1. When the control bit is (0, 0), no reset operation is executed in the first reset line R1 or the second reset line R2. When the control bit is (1, 1), a reset operation is executed in both the first reset line R1 and the second reset line R2. However, in this case, only the reset in the second reset line R2 is effective (ultra-short exposure).

Note that the $0^{th}$ offset register 13, the first offset register 14, and the second offset register 15 are rewritten once at the start of an imaging operation or by a unit of frame (in an order of second or millisecond). On the other hand, the reset control register 16 is rewritten by a line unit (synchronizing with a horizontal synchronizing signal (an order of microsecond). Note that, in that case, execution of communication processing by a line unit is necessary. However, as described later, since the control bit is only two bit data, the control bit does not impose a burden on the DSP 4 and the imaging device 2.

The readout line scanner 6 shown in FIG. 3 includes a standard exposure readout counter 17 that gives a row number of the standard exposure readout line L (hereinafter also referred to as "standard readout line number") and a short exposure readout counter 18 that gives a row number of the short exposure readout line S (hereinafter also referred to as "short readout line number"). The standard exposure readout counter 17 is a counter that runs free (counts up) on the basis of a vertical synchronizing signal and a horizontal synchronizing signal outputted from the DSP 4 described later. Specifically, the standard exposure readout counter 17 runs free according to a control signal synchronizing with a horizontal synchronizing signal outputted from the reference timing generator 8. The short exposure readout counter 18 calculates a short readout line number on the basis of a value of the standard exposure readout counter 17 and a value of the $0^{th}$ offset register 13 (a $0^{th}$ offset amount). The short readout line number runs free with a certain offset amount with respect to the standard readout line number that runs free. The readout line scanner 6 outputs signals for driving readout lines 32 (described later) of row numbers indicted by a value of the standard exposure readout counter 17 (a standard readout line number) and a value of the short exposure readout counter 18 (a short readout line number), respectively, to the driving pulse generator 9. In other words, the readout line scanner 6 decodes the standard readout line number and the short readout line number and outputs signals for activating only the effective readout lines 32 to the driving pulse generator 9 on the basis of a result of the decoding. The readout line scanner 6 outputs the value of the standard exposure readout counter 17 and the value of the short exposure readout counter 18 to the plural lines reset scanner 7.

Figure 5:
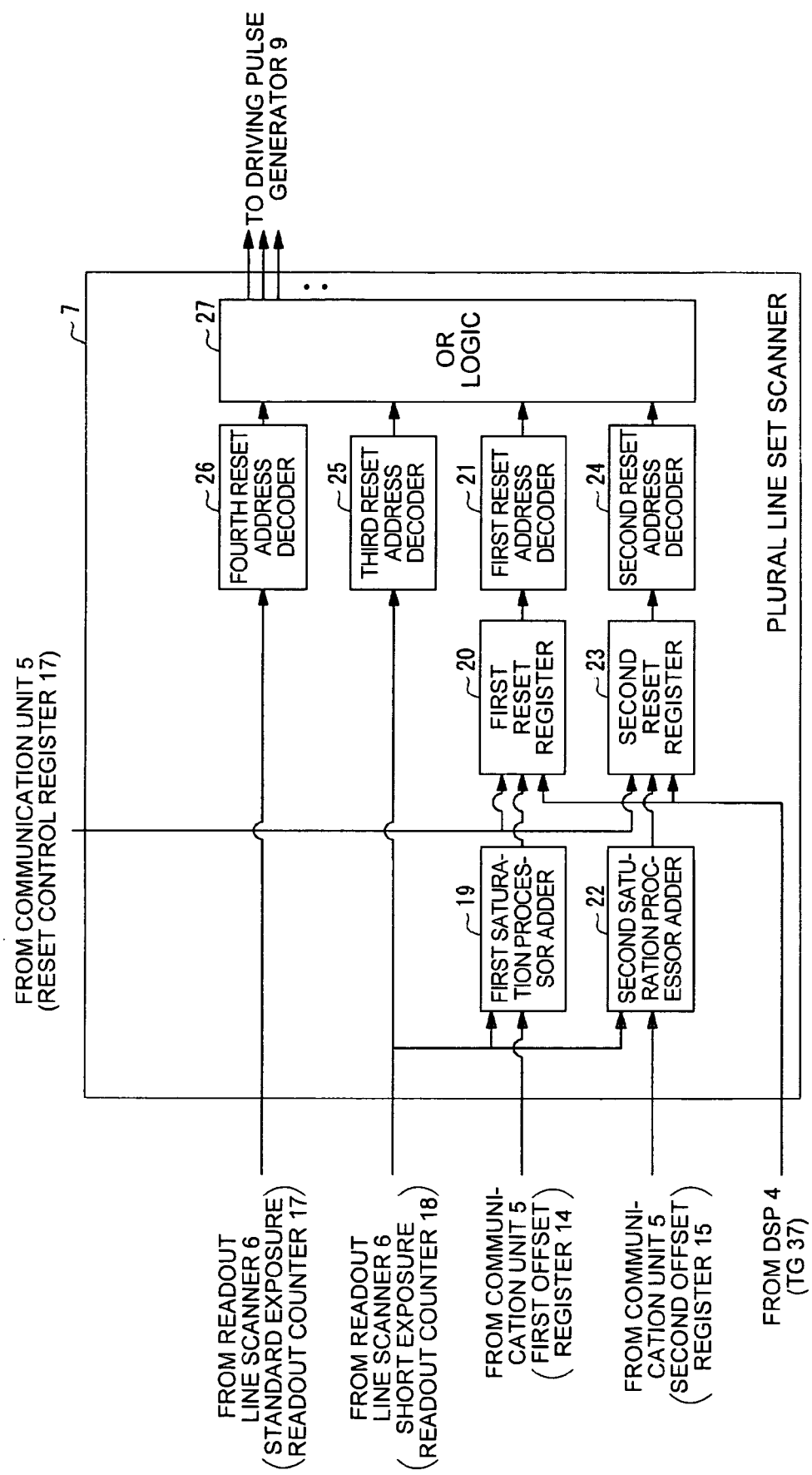
FIG. 5 is a block diagram of an internal constitution of a plural lines reset scanner in FIG. 3.

As shown in FIG. 5, the plural lines reset scanner 7 includes a first saturation processor adder 19, a first reset register 20, a first reset address decoder 21, a second saturation processor adder 22, a second reset register 23, a second reset address decoder 24, a third reset address decoder 25, a fourth reset address decoder 26, and an OR logic 27.

The first saturation processor adder 19 adds a value of the first offset register 14 of the communication unit (reception) 5 (a first offset amount) to a value of the short exposure readout counter 18 of the readout line scanner 6. Note that, when a result of the addition exceeds a total line number of the imaging device 2, the first saturation processor adder 19 applies saturation processing to the imaging device 2 and maintains an offset amount of a free-running line number. The first saturation processor adder 19 causes the first reset register 20 to hold a result of maintaining an offset amount of the free-running line number (hereinafter also referred to as "first reset line number"). The first reset register 20 is a register for holding the first reset line number.

In this embodiment, in order to simplify a constitution, when a value (a control bit) of the reset control register 16 indicates execution of a reset operation in the first reset line R1 (e.g., (0, 1) or (1, 1)), the first reset line number outputted from the first saturation processor adder 19 is held in the first reset register 20. When the control bit indicates non-execution of a reset operation in the first reset line R1 (e.g., (1, 0) or (0, 0)), "0" meaning that there is no row number corresponding to the first reset line R1 is held in the first reset register 20 (in this embodiment, it is assumed that a row number starts from "1").

The first reset address decoder 21 generates a line signal group that makes only a line signal corresponding to a row number indicated by a value of the first reset register 20 effective ("1") (a state in which a reset operation is executed on a pixel array of a row number corresponding to the line signal) and makes line signals corresponding to other line numbers ineffective ("0") (a state in which a reset operation is not executed on pixel arrays of row numbers corresponding to the line numbers) (a signal group that makes only a row number of the first reset line R1 effective). The first reset address decoder 21 outputs the generated line signal group to the OR logic 27. Note that, when a value of the first reset register 20 is "0", the first reset register 20 outputs a line signal group, which makes line signals of all row numbers ineffective ("0"), to the OR logic 27.

The second saturation processor adder 22 adds a value of the second offset register 15 of the communication unit (reception) 5 (a second offset amount) to a value of the short exposure readout counter 18 of the readout line scanner 6 (a short readout line number). Note that, when a result of the addition exceeds the total line number of the imaging device 2, the second saturation processor adder 22 applies saturation processing to the imaging device 2 and maintains an offset amount of a free-running line number. The second saturation processor adder 22 causes the second reset register 23 to hold a result of maintaining an offset amount of a free-running line number (hereinafter referred to as "second reset line number"). The second reset register 23 is a register for holding the second reset line number.

In this embodiment, in order to simplify a constitution, when a value (a control bit) of the reset control register 16 indicates execution of a reset operation in the second reset line R2 (e.g., (1, 0) or (1, 1)), the second reset line number outputted from the second saturation processor adder 22 is held in the second reset register 23. When the control bit indicates non-execution of a reset operation in the second reset line R2 (e.g., (0, 1) or (0, 0)), "0" meaning that there is no row number corresponding to the second reset line R2 is held in the second reset register 23 (in this embodiment, it is assumed that a row number starts from "1").

The second reset address decoder 24 generates a line signal group that makes only a line signal corresponding to a row number indicated by a value of the second reset register 23 effective ("1") and makes line signals of other line numbers ineffective ("0") (a signal group that makes only a row number of the second reset line R2 effective) . The second reset address decoder 24 outputs the generated line signal group to the OR logic 27. Note that, when a value of the second reset register 23 is "0", the second reset register 24 outputs a line signal group, which makes line signals of all row numbers ineffective ("0"), to the OR logic 27.

The third reset address decoder 25 generates a line signal group that makes only a line signal of a row number indicated by a value of the short exposure readout counter 18 of the readout line scanner 6 (the short readout line number) effective ("1") and makes line signals of other line numbers ineffective ("0"). The third reset address decoder 25 outputs the generated line signal group to the OR logic 27.

The fourth reset address decoder 26 generates a line signal group that makes only a line signal of a row number indicated by a value of the standard exposure readout counter 17 of the readout line scanner 6 (the standard readout line number) effective ("1") and makes line signals of other line numbers ineffective ("0"). The fourth reset address decoder 26 outputs the generated line signal group to the OR logic 27.

Figure 6:
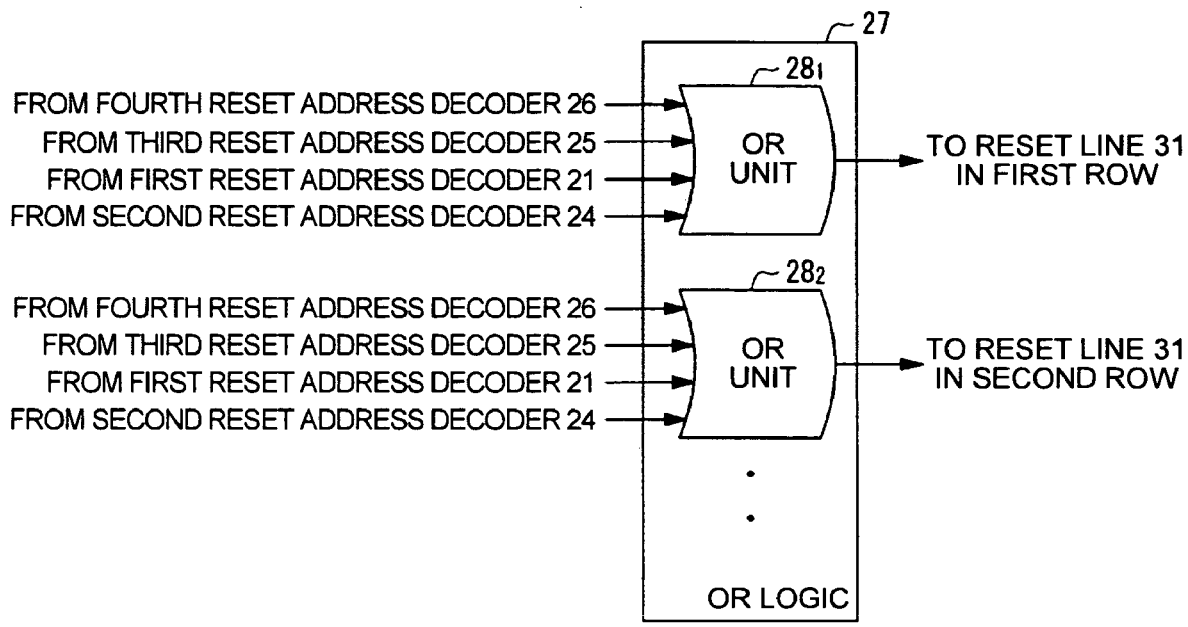
FIG. 6 is a block diagram of an internal constitution of an OR logic in FIG. 5.

The OR logic 27 subjects the line signals outputted from the first to the fourth reset address decoders 21, 24, 25, and 26 to OR operation for each line. The OR logic 27 is shown in FIG. 6 paying attention to only a certain line. As shown in FIG. 6, the OR logic 27 is an OR circuit with four inputs and one output. The OR logic 27 includes components (OR units) 28 equivalent to the number of lines. In the OR units 28, line signals of row numbers, to which the OR units 28 correspond, among the line signals outputted from the first to the fourth reset address decoders 21, 24, 25, and 26, respectively, are inputted. When "1" is included in any one of the line signals inputted, the OR units 28 sets a line signal of a reset line 31 of a corresponding row number to "1". When "1" is not included in all the line signals, that is, all the line signals are "0", the OR unit sets line signals of the reset line 31 of corresponding row numbers to "0". The OR logic 27 outputs a result of the arithmetic operation to the driving pulse generator 9.

Moreover, as shown in FIG. 3, the reference timing generator 8 generates reference timing for driving the reset lines 31 and readout lines 32 of the sensor cell array 10 on the basis of a horizontal synchronizing signal and a vertical synchronizing signal outputted from a TG 37 (described later) of the DSP 4. The reference timing generator 8 outputs the generated reference timing to the driving pulse generator 9. The reference timing generator 8 outputs a control signal for causing the standard exposure readout counter 17 to free-run to the readout line scanner 6. The reference timing generator 8 outputs a control signal for giving update timing for the $0^{th}$ to the second offset registers 13 to 15 and the reset control register 16 to the plural lines reset scanner 7.

In accordance with the reference timing outputted from the reference timing generator 8, the driving pulse generator 9 drives the reset lines 31 (see FIG. 7) corresponding to pixel arrays of row numbers indicated as effective ("1") by a line signal, which is outputted from the plural lines reset scanner 7 (the OR logic 27), at specified timing. The driving pulse generator 9 drives the readout lines 32 (see FIG. 7) corresponding row numbers indicated by a readout line signal, which is outputted from the readout line scanner 6, at specific timing. The "specific timing" is not particularly limited.

Figure 7:
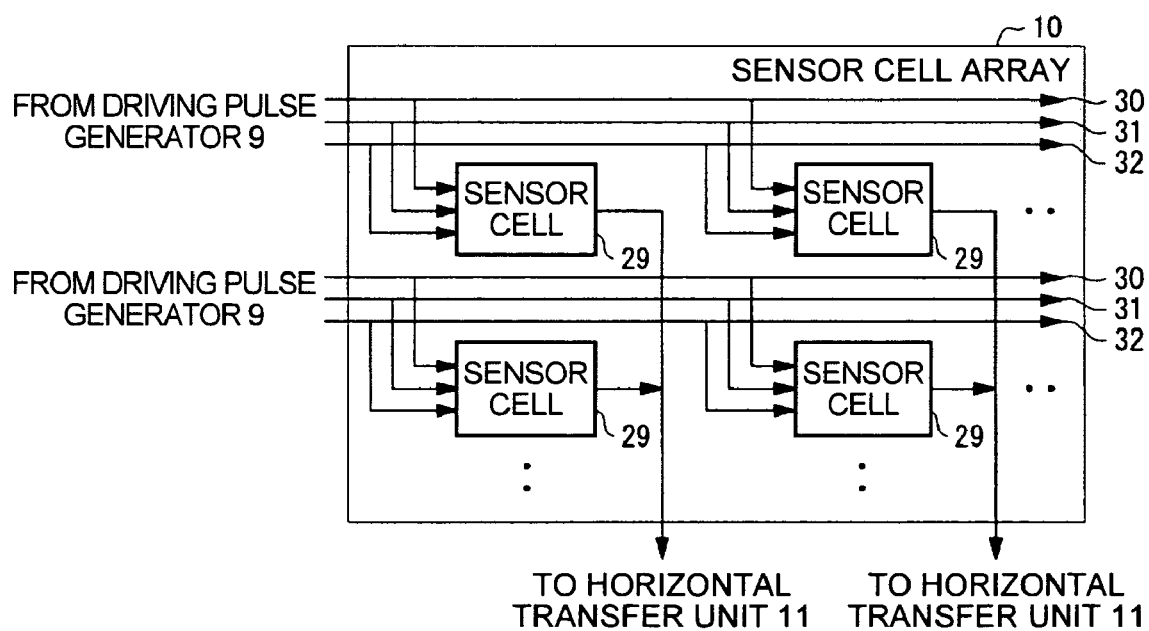
FIG. 7 is a block diagram of an internal constitution of a sensor cell array in FIG. 3.

As shown in FIG. 7, the sensor cell array 10 includes plural sensor cells 29 arranged in a matrix shape in a plan view and plural address lines 30, plural reset lines 31, and plural readout lines 32 that are set in association with respective rows of the respective sensor cells 29 arranged in a transverse direction in a plan view. The sensor cell array 10 converts light condensed by an imaging lens (not shown) into charges in the respective sensor cells 29 and accumulates the charges. When the corresponding reset lines 31 are driven, the sensor cell array 10 executes a reset operation (an operation for disposing of charges being accumulated). Moreover, when the corresponding readout lines 32 are driven, the sensor cell array 10 outputs charges accumulated in the horizontal transfer unit 11.

As shown in FIG. 3, the horizontal transfer unit 11 transfers a group of charges (charges for one pixel array) outputted from the sensor cell array 10 (the sensor cells 29 for one pixel array) to the AFE 3 sequentially.

The imaging apparatus according to this embodiment includes the imaging device 2, the AFE 3, and the DSP 4.

Figure 8:
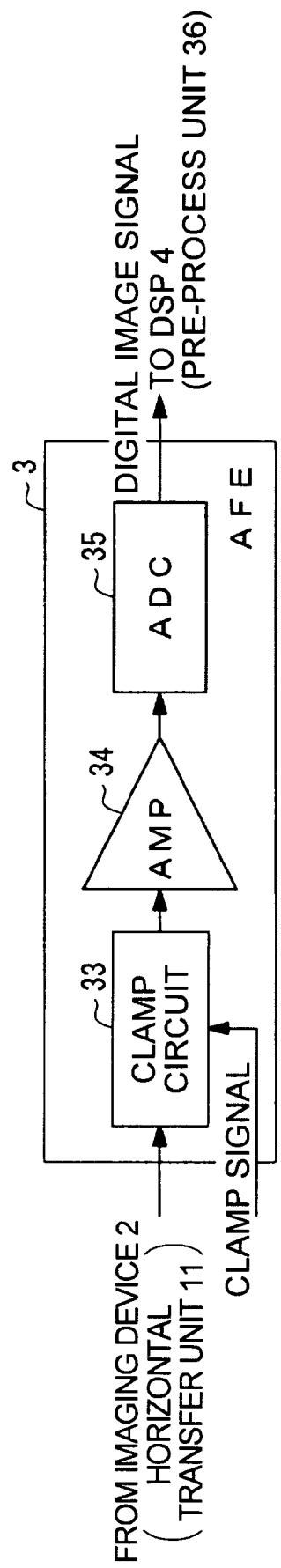
FIG. 8 is a block diagram of an internal constitution of an AFE in FIG. 2.

As shown in FIG. 8, the AFE 3 clamps a charge (a voltage) transferred from the imaging device 2 (the horizontal transfer unit 11) in a clamp circuit 33. The AFE 3 amplifies the clamped voltage in the AMP 34, converts the amplified voltage into a digital image signal (a signal indicating an image for one pixel) in the ADC 35, and outputs the digital image signal to a pre-process unit 36 (described later) of the DSP 4.

Figure 9:
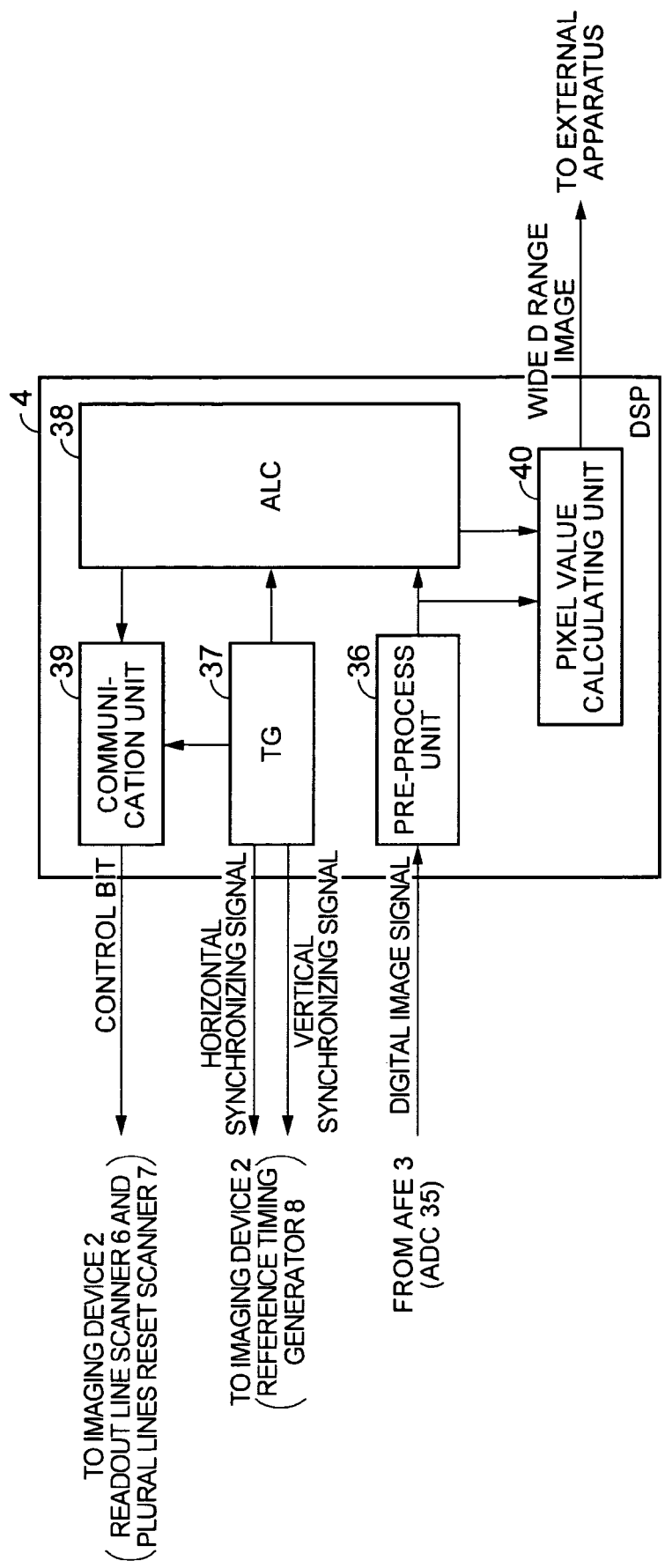
FIG. 9 is a block diagram of an internal constitution of a DSP in FIG. 2.

As shown in FIG. 9, the DSP 4 includes the pre-process unit 36, a timing control unit (TG) 37, an Automatic Level Control (ALC) 38, a communication unit (transmission) 39, and a pixel value calculating unit 40. The ALC 38 is a logic that controls brightness of an imaged image. The ALC controls exposure time such as an image with no saturation and a satisfactory S/N ratio is obtained.

Before explaining a constitution of the imaging apparatus, an exposure code, which is an important concept of the invention, will now be explained. An exposure code in this embodiment includes three kinds of codes, namely, a code "1", a code "2", and a code "3".

The code "1" indicates a state in which a reset operation is not executed in both the first rest line R1 and the second reset line R2. In other words, the code "1" indicates "medium exposure" in FIG. 11 described later.

The code "2" indicates a state in which a reset operation is executed only in the first reset line R1. In other words, the code "2" indicates "short exposure" in FIG. 11 described later.

The code "3" indicates a state in which a reset operation is executed only in the second reset line R2. In other words, the code "3" indicates "ultra-short exposure" in FIG. 11 described later.

In this way, the imaging apparatus controls at least three exposure conditions.

Figure 10:
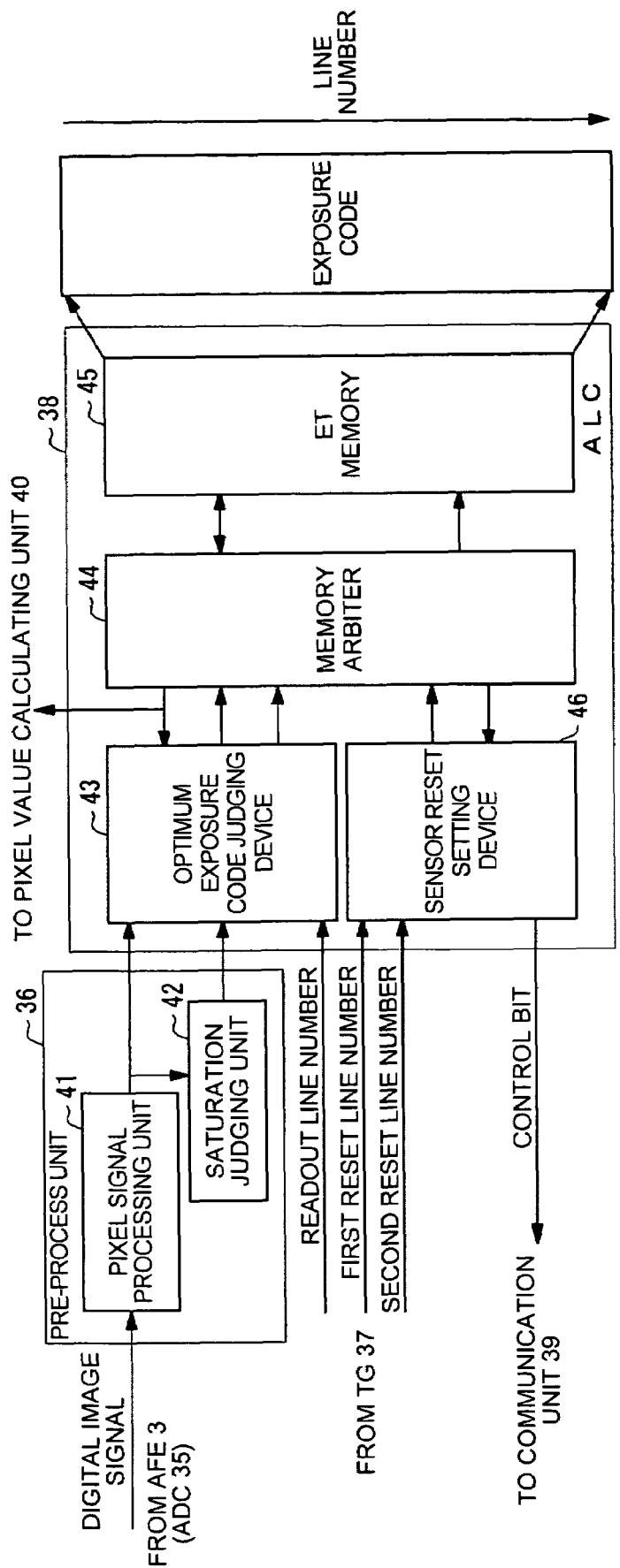
FIG. 10 is a block diagram of an internal constitution of a pre-process unit and an ALC in FIG. 9.

As shown in FIG. 10, the pre-process unit 36 subjects a digital image signal outputted from the AFE 3 (the ADC 35) to signal processing (e.g., black level correction) in the image signal processing unit 41. The pre-process unit 36 outputs the digital image signal subjected to signal processing to the ALC 38 (an optimum exposure code judging device 43 (described later)) and the pixel value calculating unit 40. The pre-process unit 36 includes a saturation judging unit 42 that judges whether a luminance value of the digital image signal subjected to signal processing is in a saturation state (a maximum value of an output gradation) . The pre-process unit 36 outputs a result of the judgment of the saturation judging unit 42 (a judgment flag) to the optimum exposure code judging device 43.

The TG 37 shown in FIG. 9 generates a horizontal synchronizing signal and a vertical synchronizing signal and outputs the synchronizing signals to the imaging device 2 (the reference timing generator 8). The TG 37 calculates a standard readout line number, a short readout line number, a first reset line number, and a second reset line number and outputs the line numbers to the ALC 38 (the optimum exposure code judging device 43 and a sensor reset setting device 46). Note that the TG 37 is capable of controlling offset amounts (a $0^{th}$ offset amount, a first offset amount, and a second offset amount) of the first reset line number and the second reset line number with respect to the readout line numbers with an external microcomputer (not shown).

As shown in FIG. 10, the ALC 38 includes the optimum exposure code judging device 43, a memory arbiter 44, an ET memory 45, and the sensor reset setting device 46. The ET memory 45 is an abbreviation of an Exposure Time memory. The ET memory 45 records a code corresponding to exposure time (an exposure code) for each pixel array. "For each pixel array" means that one address of the ET memory 45 is associated with each pixel array number.

The optimum exposure code judging device 43 judges whether an exposure condition is satisfactory for each pixel array on the basis of judgment flags outputted from the saturation judging unit 42 sequentially. When the exposure condition is not satisfactory, the optimum exposure code judging device 43 changes the exposure condition. Specifically, first, the optimum exposure code judging device 43 outputs an instruction for reading out an exposure code (numerical values "1" to "3"), which indicates an exposure condition of an image signal (a pixel array for which saturation judgment is performed) being inputted to the DSP 4 at present, from the ET memory 45 (hereinafter also referred to as "readout instruction") to the memory arbiter 44. Note that a readout line number is inputted to the optimum exposure code judging device 43 from the TG 37. The optimum exposure code judging device 43 calculates an address of the ET memory 45 from this number and sets the calculated address as a part of the readout instruction. Subsequently, the optimum exposure code judging device 43 counts the number of judgment flags outputted from the saturation judging unit 42 and judges whether a total number of the judgment flags is equal to or larger than a predetermined ration (e.g., 10%) of a total number of pixels in one pixel array. When it is judged that the total number is equal to or larger than the predetermined ratio, the optimum exposure code judging device 43 outputs an instruction for adding "1" to the numerical value indicating the read-out exposure code and writing a new exposure code, which indicates that the short exposure time is short, in the ET memory 45 (hereinafter also referred to as "writing instruction"). When the total number of the judgment flags is smaller than the predetermined ratio of the total number of pixels in one pixel array, the optimum exposure code judging device 43 judges whether the number of the judgment flags is 0. If the number of the judgment flag is 0, the optimum exposure code judging device 43 subtracts "1" from the numerical value indicating the read-out exposure code and outputs a writing instruction for writing a new exposure code, which indicates that the short exposure time is long, in the ET memory 45 to the memory arbiter 44. Note that, when the number of the judgment flags is smaller than the predetermined ratio of the total number of pixels in one pixel array and is not 0, the optimum exposure code judging device 43 causes the memory arbiter 44 to hold the read-out exposure code.

The memory arbiter 44 arbitrates accesses to the ET memory 45 by the optimum exposure code judging device 43 and the sensor reset setting device 46. Specifically, when a readout instruction is outputted from the optimum exposure code judging device 43, the memory arbiter 44 reads out an exposure code indicating an exposure condition from the ET memory 45 and outputs the read-out exposure code to the optimum exposure code judging device 43. When a writing instruction is outputted from the optimum exposure code judging device 43, the memory arbiter 44 writes a new exposure code in the ET memory 45. Note that an address of an ET memory, which should be accessed, is calculated from a short readout line number in the optimum exposure code judging device 43 and a value of the address is outputted to the memory arbiter 44. Moreover, when an exposure code read-out instruction is outputted from the sensor reset setting device 46, the memory arbiter 44 reads out an exposure code from the ET memory 45 and outputs the exposure code to the sensor reset setting device 46. Note that, in the sensor reset setting device 46, a first reset line number and a second reset line number are inputted from the TG 37, an address of an ET memory to be accessed is calculated from the numbers, and a value of the address is outputted to the memory arbiter 44. An exposure code corresponding to this address is read out from the ET memory 45 and outputted to the sensor reset setting device 46.

When a writing request is sent from the memory arbiter 44, the ET memory 45 stores an exposure code. When a readout request is sent from the memory arbiter 44, the ET memory 45 outputs an exposure code to the memory arbiter 44. Note that, in an initial state, the ET memory 45 records "2" as an exposure code corresponding to each pixel array.

The sensor reset setting device 46 outputs an instruction for reading out exposure codes corresponding to the first reset line number and the second reset line number outputted from the TG 37 from the ET memory 45 (hereinafter also referred to as "exposure code readout instruction") to the memory arbiter 44. When the sensor reset setting device 46 receives the two exposure codes from the memory arbiter 44, the sensor reset setting device 46 generates a control bit (2 bits) from the two exposure codes. The sensor reset setting device 46 outputs the control bit to the communication unit (transmission) 39.

A method of generating a control bit will now be explained. When an exposure code corresponding to the second reset line number is "3", as described above, a reset operation is performed in a row corresponding to the second reset line number. When the exposure code is "1" or "2", the reset operation is not performed. When an exposure code corresponding to the first reset line number is "2", as described above, a reset operation is performed in a row corresponding to the first reset line number. When the exposure code is "1" or "3", the reset operation is not performed. Consequently, a control bit is generated as described below. When an exposure code corresponding to the second reset line number is "3", a control bit $(C_{R2}, C_{R1})$ is set as $(1, X)$. When the exposure code is "1" or "2", the control bit $(C_{R2}, C_{R1})$ is set as $(0, X)$. X indicates "0" or "1". When an exposure code corresponding to the first reset line number is "2", the control bit $(C_{R2}, C_{R1})$ is set as $(X, 1)$. When the exposure code is "1" or "3", the control bit (CR2, CR1) is set as (X, 0). For example, when an exposure code corresponding to the second reset line number outputted from the TG 37 is "3" and an exposure code corresponding to the first reset line number is "1", since the control bit $(C_{R2}, C_{R1})$ is $(1, X)$ in the former case and $(X, 0)$ in the latter case, $(1, 0)$ is outputted as a control bit. When an exposure code corresponding to the second reset line number is "3" and an exposure code corresponding to the first reset line number is "2", $(1, 1)$ is outputted as a control bit.

The communication unit (transmission) 39 outputs a control bit outputted from the ALC 38 (the sensor reset setting device 46) to the imaging device 2 (the communication unit (reception) 5). Note that a control bit is transmitted by a unit of a pixel array (line). However, since the control bit has only two bits, the control bit does not impose a burden on the DSP 4 and the imaging device 2.

On the other hand, the pixel value calculating unit 40 generates an image with a wide dynamic range (a wide D range image) on the basis of a digital image signal outputted from the pre-process unit 36 (the image signal processing unit 41) and an exposure code read out from the ALC 38 (the memory arbiter 44). The pixel value calculating unit 40 outputs the generated wide D range image to an external apparatus (not shown). The invention does not refer to a constitution of the pixel value calculating unit 40.

Operations of the Imaging Apparatus

Operations of the imaging apparatus will now be explained with reference to FIG. 11.

As described above, the imaging device applies processing to four lines, namely, the standard exposure readout line L, the short exposure readout line S, the first reset line R1, and the second reset line R2, simultaneously. As described above, the respective lines L, S, R1, and R2 free-run at the same speed with specific offset amounts. Specifically, an offset amount of the standard readout line number and the short readout line number is determined by the $0^{th}$ offset register. An offset amount of the short readout line number and the first reset line number is determined by the first offset register. An offset amount of the short readout line number and the second reset line number is determined by the second offset register. Consequently, line numbers of the standard exposure readout line L, the short exposure readout line S, the first reset line R1, and the second reset line R2 free-run (count up) at the same speed with specific phase differences. FIG. 11 shows movement of the free-run.

Figure 11:
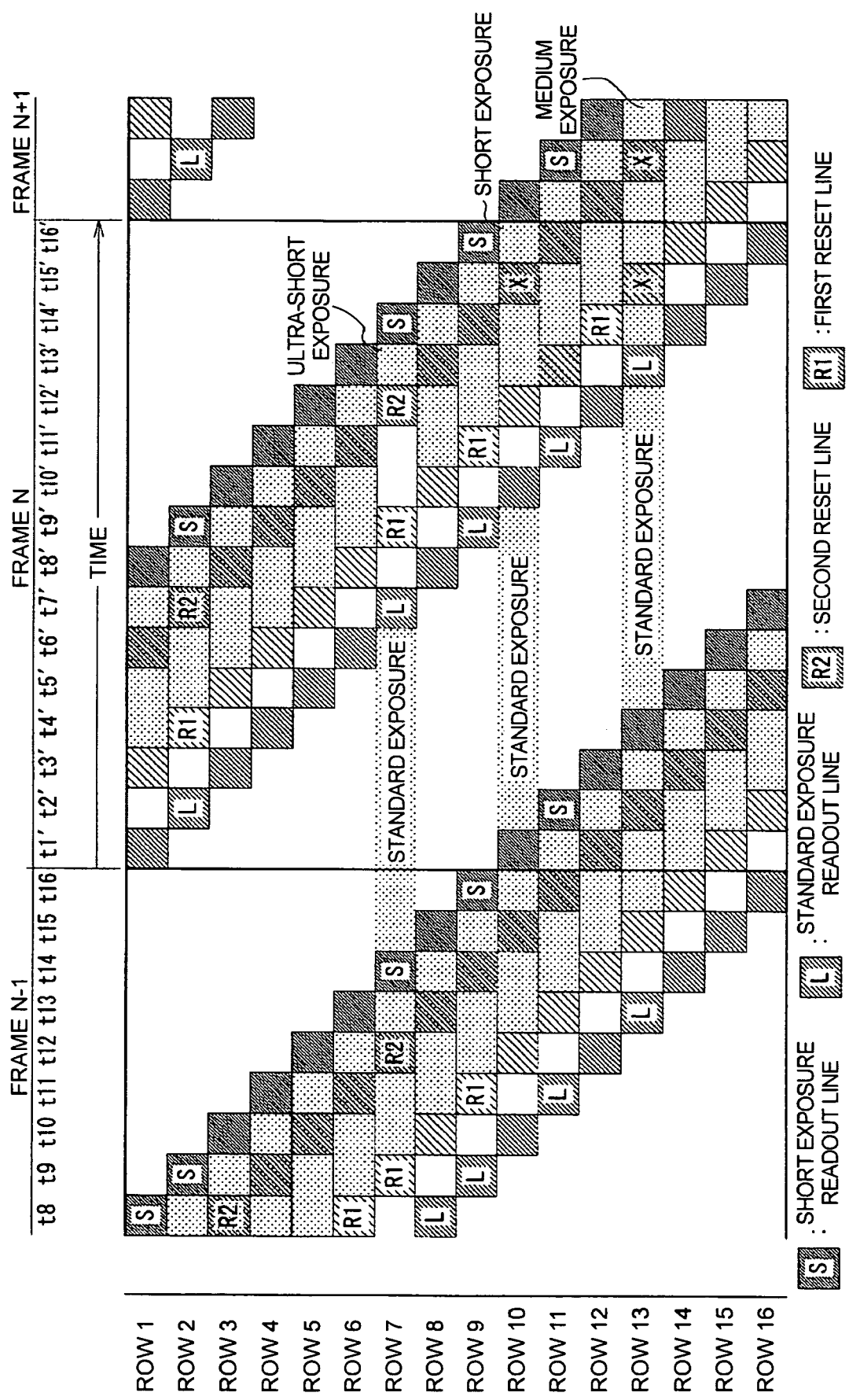
FIG. 11 is a diagram for explaining operations of the invention.

In FIG. 11, an ordinate indicates a line (row) number and an abscissa indicates time. Note that, in this embodiment, the number of rows is set to sixteen for explanation. In the time on the abscissa, one frame period is divided into the number of rows (divided into sixteen) and it is indicated in which period the respective line numbers are effective. Parts marked L in the figure indicate the standard readout lines L (numbers), parts marked S indicate the short readout lines S, parts marked R1 indicates the first reset lines R1, parts marked R2 indicate the second reset lines R2. For example, paying attention to a period of t1', a first row indicates the standard readout line, a tenth row indicates the short readout line, a twelfth row indicates the second reset line R2, and a fifteenth row indicates the first reset line R1. Note that, in this embodiment, a reset operation is performed immediately after standard readout and short readout are performed.

In FIG. 11 it is assumed that the $0^{th}$ to the second offset amounts are set to "7", "5", and "2". In other words, a phase difference between the standard exposure readout line L and the short readout line is equivalent to seven lines, a phase difference between the short exposure readout line S and the first reset line R1 is equivalent to five lines, and a phase difference between the short exposure readout line S and the second reset line R2 is equivalent to two lines.

Moreover, according to FIG. 11, there are three kinds of combinations of standard exposure and short exposure. A first combination is an exposure condition named "medium exposure" in which a reset operation is not executed in the first reset line R1 or in the second reset line R2. In the first combination, it is possible to set the short exposure time longest and improve a S/N ratio in a bright part. A second combination is an exposure condition named "ultra-short exposure" in which the second reset line R2 is executed. In the second combination, it is possible to set the short exposure time shortest and perform photographing without saturating an extremely bright part. A third combination is an exposure condition named "short exposure" in which the first reset line R1 is executed. Exposure time in the third combination is intermediate exposure time of the two exposure conditions described above.

Operations of the ALC 38 in the DSP 4 will now be explained.

First, the ALC 38 evaluates brightness (a luminance value) of an imaged image signal from the imaging device 2 by a unit of frame and calculates standard exposure time and short exposure time on the basis of a result of the evaluation. Both the standard exposure time and the short exposure time are determined by the $0^{th}$ offset register 13 of the imaging device 2. In other words, the ALC 38 calculates a value to be set in the $0^{th}$ offset register 13 on the basis of a result of the evaluation and outputs the value to the communication unit (transmission) 39 of the DSP 4. The communication unit (transmission) 39 transmits the outputted value to the imaging device 2. The imaging device 2 sets the transmitted value in the $0^{th}$ offset register 13. The ALC 38 acquires an image signal of short exposure readout, evaluates brightness (a luminance value) of the imaged image, and calculates a value, which should be set in the first offset register 14 and the second offset register 15 of the imaging device 2, on the basis of a result of the evaluation. The ALC 38 outputs the calculated value to the communication unit (transmission) 39. The communication unit (transmission) 39 transmits the outputted value to the imaging device 2. The imaging device 2 sets the transmitted value in the first offset register and the second offset register. According to the processing described above, an initializing operation for the imaging device 2 ends. After that, the ALC 38 performs most important exposure control by a line unit.

Specific operations of the imaging apparatus will be described below on the basis of the operations described above.

First, as shown in FIG. 11, at the time of imaging of a frame (N-1), it is assumed that all lines are in a state in which reset is performed in the first reset line R1 (the short exposure state), that is, an exposure code is set to "2". Under this exposure condition, it is assumed that an amount of incident light on a seventh pixel array increases and an amount of incident light in a thirteenth row decreases. On this assumption, operations of the imaging device 2 and the DSP 4 (the ALC 38) will now be explained.

Attention is paid to a period of t9 in the frame N-1. In the period of t9, a result of addition of the first saturation processor adder 19 shown in FIG. 5 is "7" and a result of addition of the second saturation processor adder 22 is "4". In the period of t9, a control bit (0, 1) is held in the reset control register 16. Then, a numerical value "7" is held in the first reset register 20 and a numerical value "0" is held in the second reset register 23. As shown at t9 in FIG. 11, the first reset line R1 indicates a seventh row and the second reset line R2 corresponds to no row. A signal line group making only a line signal corresponding to a row number (a seventh row) indicated by a value of the first reset register 20 effective ("1") is outputted to the OR logic 27 by the first reset address decoder 21. Simultaneously, a line signal group making all pixel arrays ineffective ("0") (a signal group not making a line signal corresponding to a fourth row effective) is outputted to the OR logic 27. A line signal of a seventh row and a line signal, which indicates that a reset operation is applied to only a standard exposure readout line and a short exposure readout line for which readout of charges is finished, are outputted to the driving pulse generator 9 by the OR logic 27. Consequently, as shown in FIG. 3, the reset line 31 corresponding to the pixel array in the seventh row is driven by the driving pulse generator 9. As a result, a reset operation is performed in the sensor cell 29 in the seventh row.

After the end of an operation for three lines since the reset operation in the seventh row is performed (a t12 period in FIG. 11), a result of addition of the first saturation processor adder 19 shown in FIG. 5 is "10" and a result of addition of the second saturation processor adder 22 is "7". A control bit (0, 1) is held in the reset control register 16. Then, a numerical value "10" is held in the first reset register 20 and a numerical value "0" is held in the second reset register 23. The first reset line R1 indicates a tenth row and the second reset line R2 corresponds to no row. A signal line group making only a line signal corresponding to a row number (a tenth row) indicated by a value of the first reset register 20 effective ("1") is outputted to the OR logic 27 by the first reset address decoder 21. Simultaneously, a line signal group making all .pixel arrays ineffective ("0") (a signal group not making a line signal corresponding to a seventh row effective) is outputted to the OR logic 27. A line signal in a tenth row and a line signal, which indicates that a reset operation is applied to only a standard exposure readout line and a short exposure readout line for which readout of charges is finished are outputted to the driving pulse generator 9 by the OR logic 27. Consequently, as shown in FIG. 3, the reset line 31 corresponding to the pixel array in the tenth row is driven by the driving pulse generator 9. As a result, a reset operation is not executed in the seventh row and a reset operation is performed in the sensor cell 29 in the tenth row.

Moreover, in a period of t14 in FIG. 11, a signal making the readout line 32 of the pixel array in the seventh row active is outputted to the driving pulse generator 9 by the readout line scanner 6 shown in FIG. 3. The short exposure readout line S comes into a state in which the short exposure readout line S indicates the seventh row. Then, the readout line 32 corresponding to the pixel array in the seventh row is driven by the driving pulse generator 9. Subsequently, the reset line 31 corresponding to the pixel array in the seventh row is driven. Specifically, charges (photoelectrically converted signals) accumulated in the sensor cell 29 in the seventh row are outputted to the horizontal transfer unit 11. Thereafter, a reset operation is performed.

According to the operation described above, charges (photoelectrically converted signals) accumulated in a period from the reset in the first reset line R1 until the readout in the short exposure readout line S (short exposure time) are outputted in the period of t14 in FIG. 14.

Operations of the DSP 4 (the ALC 38) will also be explained. A signal, which is outputted from the horizontal transfer unit 11 and photoelectrically converted, is transferred to the AFF 3. As shown in FIG. 7, the signal is outputted to the DSP 4 (the pre-process unit 36) by the AFF 3 as a digital image signal (a signal indicating an image for one pixel array). Moreover, the digital image signal is subjected to black level correction or the like digitally by the pre-process unit 36 shown in FIGS. 9 and 10 and is outputted to the pixel value calculating unit 40. In the pre-process unit 36, it is judged by the saturation judging unit 42 whether the digital image signal is in a saturation stage. A judgment flag is outputted to the optimum exposure code judging device 43.

In the optimum exposure code judging device 43, an optimum exposure code is judged again according to the judgment flag and an exposure code (which has already been read and has a value "2") indicating an imaging condition for a present input image signal. For example, it is assumed that the number of judgment flags outputted from the pre-process unit 36 increases to be equal to or more than a specified value (e.g., 10%) of the total number of pixels in one pixel array. Then, "1" is added to the numerical value "2" indicting an exposure code of the pixel array in the seventh row by the optimum exposure code judging device 43. A writing instruction is outputted to the memory arbiter 44 as a new exposure code "3". The new exposure code "3" set is written in the ET memory 45 by the memory arbiter 44.

Operations of a line in the tenth row reset as described above will be examined. In a period of t15 in FIG. 11, a result of addition of the first saturation processor adder 19 shown in FIG. 5 is "13" and a result of addition of the second saturation processor adder 22 is "10". A control bit (0, 1) is held in the reset control register 16. Then, a numerical value "13" is held in the first reset register 20 and a numerical value "0" is held in the second reset register 23. The first reset line R1 indicates a thirteenth row and the second reset line R2 has no corresponding row. As a result, a reset operation is not executed in the tenth row and a reset operation is performed in the thirteenth row.

Moreover, paying attention to the tenth row, in a period of t2' of a frame N in FIG. 11, a signal making the readout line 32 of a pixel array in the tenth row effective is outputted to the driving pulse generator 9 by the readout line scanner 6 in FIG. 3 and the short exposure readout line S comes into a state in which the short exposure readout line S indicates the tenth row. Then, the readout line 32 corresponding to the pixel array in the tenth row is driven by the driving pulse generator 9 and a photoelectrically converted signal is outputted to the outside of the imaging device 2. The outputted signal is inputted to the pre-process unit 36. A digital image signal of the tenth row is outputted from the pre-process unit 36 to the optimum exposure code judging device 43.

It is assumed that a result of judgment in the optimum exposure code judging device 43 (the number of judgment flags outputted from the pre-process unit 36) is equal to or smaller than a predetermined value (%) of the total number of pixels in one pixel array. Then, a numerical value "2" indicating an exposure code of the pixel array in the seventh row is held by the optimum exposure code judging device 43. An exposure code "2" is held in the ET memory 45.

It is assumed that the flow described above is repeated in other pixel arrays and the imaging for the frame (N-1) ends. Imaging for the frame N shown in FIG. 11 is started. In a period of t9' (corresponding to t9 of the frame (N-1)), a result of addition of the first saturation processor adder 19 is "7" and a result of addition of the second saturation processor adder 22 is "4". Then, an exposure code "3" (an updated value) corresponding to the pixel array in the seventh row and an exposure code "2" (not updated) corresponding to the pixel array in the fourth row are read out from the memory arbiter 44 by the sensor reset setting device 46 shown in FIG. 10. A control bit (0, 0) is generated on the basis of the exposure codes "3" and "2". The control bit (0, 0) is transmitted to the imaging device 2 through the communication unit (transmission) 39 of the DSP 4. The transmitted control bit (0, 0) is held in the reset control register 16 of the communication unit (reception) 5 by the imaging device 2 shown in FIG. 9. A numerical value "0" is held by the first reset register 20 and the second reset register 23 on the basis of a value of the reset control register 16. The first and the second reset lines R1 and R2 have no corresponding row. As a result, no reset operation is executed in the fourth row or in the seventh row. In this way, paying attention to the seventh row, the first reset, which is executed in the N-1 frame, is not executed. Note that it is possible to control an exposure condition for each line simply by exchanging (communicating) a control bit of only 2 bits by a line unit between the DSP 4 and the imaging device 2.

After the end of an operation for three lines from the time t9' (a period of t12' in FIG. 11), a result of addition of the first saturation processor adder 19 shown in FIG. 5 is "10" and a result of addition of the second saturation processor adder 22 is "7". Then, an exposure code "2" (not updated) corresponding to the pixel array in the tenth row and an exposure code "3" (an updated value) corresponding to the pixel array in the seventh row are read out from the memory arbiter 44 by the sensor reset setting device 46 shown in FIG. 10. A control bit (1, 1) is generated on the basis of the exposure codes "2" and "3". The control bit (1, 1) is held in the reset control register 16 of the communication unit (reception) 5 of the imaging apparatus 1 through the communication unit 39 of the DSP 4. A numerical value "10" is held in the first reset register 20 and a numerical value "7" is held in the second reset register 23. In other words, the first reset line R1 indicates the tenth row and the second reset line R2 indicates the seventh row. As a result, a reset operation is executed in the seventh row and the tenth row. In this way, paying attention to the seventh row, the second reset, which is not executed in the N-1 frame, is executed.

Moreover, after the end of an operation for two lines since the reset operation in the seventh row is performed (a period of t14' in FIG. 11), a signal making the readout line 32 of the pixel array in the seventh row effective is outputted to the driving pulse generator 9 by the readout line scanner 6 shown in FIG. 3 and the short exposure readout line S indicates the seventh row. Then, the readout line 32 corresponding to the pixel array in the seventh row is driven by the driving pulse generator 9. Charges (photoelectrically converted signals) accumulated in the sensor cell 29 in the seventh row are outputted to the horizontal transfer unit 11. Thereafter, a reset operation is performed. In other words, charges accumulated since the reset in the second reset line R2 until the readout in the short exposure readout line S (ultra-short exposure time) are outputted. Thus, compared with the first reset performed in the frame N-1, the second reset performed in the frame N can reduce short exposure time and further reduce the number of saturated pixels (makes it possible to perform photographing of a bright subject). In other words, since an amount of incident light on the pixel array is increased in the seventh row in the N-1 frame as described above, the imaging apparatus (the ALC 38) functions to operate to reduce the number of saturated pixels. Note that the signal (the digital image signal in the seventh row) photoelectrically converted (outputted to the outside) is outputted to the optimum exposure code judging device 43 through the pre-process unit 36. After that, the operation described above is executed repeatedly by the DSP 4.

In this way, in this embodiment, when a control bit held in the reset control register 16 is (0, 1), a reset operation is performed only in the first reset line R1 and, when the control bit is (1, 0), a reset operation is performed only in the second reset line R2. When the control bit is (0, 0), no reset operation is performed in the first reset line R1 or in the second reset line R2. When the control bit is (1, 1), a reset operation is performed in both the first reset line R1 and the second reset line R2 simultaneously. Therefore, it is possible set reset timing for each line. Unlike the method of resetting lines one by one sequentially, it is possible to set an appropriate length of exposure time for each pixel array.

When there is no saturated pixel in a pixel array in an image that has been imaged with show exposure time in a preceding frame period, the short exposure time in the pixel array is set long (medium exposure time). When there are saturated pixels equal to or more than a specific ratio in the pixel array, the short exposure time in the pixel array is set short (ultra-short exposure time). Consequently, it is possible to improve a S/N ratio in respective pixel arrays and reduce the number of saturated pixels in an image that has been imaged with short exposure time in a subsequent frame period. Therefore, by replacing pixels with a maximum luminance value in an image that has been imaged with standard exposure time with pixels in an image that has been imaged with the set short exposure time, it is possible to generate an image with a wider dynamic range and a higher S/N ratio, for example, compared with the method of executing the replacement using an image that has been imaged with the same short exposure time in all areas.

Note that, in the imaging device 2 in this embodiment, the communication unit (reception) 5, the plural lines reset scanner 7, and the driving pulse generator 9 in FIG. 3, the reset control register 16 in FIG. 4, the first reset register 20, the first reset address decoder 21, the second reset register 23, the second reset address decoder 24, and the OR logic 27 constitute a reset unit described in claims. Similarly, the plural lines reset scanner 7 and the short exposure readout counter 18 in FIG. 3 and the first saturation processor adder 19 and the second saturation processor adder 22 in FIG. 5 constitute a line specifying unit. The first reset register 20 and the second reset register 23 in FIG. 5 constitute a reset control unit. The short exposure readout counter 18 in FIG. 3 constitutes a free-running counter. The first saturation processor adder 19 in FIG. 5 constitutes a first-line specifying unit. The second saturation processor adder 22 in FIG. 5 constitutes the first line specifying unit. The communication unit 5 in FIG. 3 constitutes a control signal receiving unit.

In the imaging apparatus 1 in this embodiment, the TG 37 and the ALC 38 in FIG. 9 and the optimum exposure code judging device 43, the ET memory 45, and the sensor reset setting device 46 in FIG. 10 constitute a control signal generating unit and a short exposure time setting unit. The communication unit 39 in FIG. 9 constitutes a control signal transmitting unit. The ET memory 45 in FIG. 10 constitutes a code storing unit. The TG 37 in FIG. 9 constitutes a reset line specifying unit. The sensor reset setting device 46 in FIG. 10 constitutes a signal generating unit. The optimum exposure code judging device 43 in FIG. 10 constitutes a code updating unit.

Note that the imaging device and the imaging apparatus are not limited to those described in the embodiment and can be changed appropriately in a range not departing from the spirit of the invention.

In the embodiment, the two reset lines (the first and the second reset lines R1 and R2) are used to control execution and non-execution of a reset operation. However, the invention is not limited to this example. For example, three or more reset lines may be used.

In addition, in the embodiment, execution and non-execution of a reset operation in the first and the second reset lines R1 and R2 are controlled to set a length of short exposure time. However, the invention is not limited to this example. For example, in addition to the control for a reset operation in the first and the second reset lines R1 and R2, execution and non-execution of a readout operation in the short exposure readout line S may be controlled. Consequently, if a reset operation in the first and the second reset lines R1 and R2 is not executed and a readout operation in the short exposure readout line S is not executed either, reset following readout is not executed. Thus, it is possible to execute an exposure operation in a period from a readout operation in the standard exposure readout line L in a preceding frame period until a readout operation in the standard exposure readout line L in a subsequent frame period (full exposure time longer than standard exposure time).

In addition to the control for a readout operation in the short exposure readout line S, exposure and non-exposure of a readout operation in the standard exposure readout line L may be controlled. Consequently, if a reset operation in the first and the second reset lines R1 and R2 and a readout operation in the short exposure readout line S are not executed and a readout operation in the standard exposure readout line L is not executed either, reset following readout is not executed. Thus, it is possible to execute an exposure operation in a period from a readout operation in the standard exposure readout line L in a frame period two or more periods earlier than a present frame period until a new readout operation in the standard exposure readout line L, that is, over long exposure time longer than full exposure time.

Moreover, in the embodiment, execution and non-execution of a reset operation in the first and the second reset lines R1 and R2 are controlled. However, the invention is not limited to this example. For example, when plural dummy lines (lines not forming an image, for example, a light-shielding area) having a characteristic equivalent to that of the reset line 31 are set as reset object lines and a reset operation for reset object lines forming the image is not executed, the dummy lines may be driven instead of the first and the second reset lines R1 and R2. Consequently, it is possible to prevent a deficiency caused by a change in the number (load) of the reset lines 31 to be driven, for example, fluctuation in application of reset (temporal shift). Note that, when a reset operation for the reset object lines forming the image is not executed, as a method of driving the dummy lines, for example, there is a method of causing the first reset address decoder 21 or the second reset address decoder 24 to select the dummy lines when a value of the reset register 20 is "0" or a value of the second reset register 23 is "0" (when there is no reset object line).

What is claimed is:

1. An imaging device that realizes a rolling shutter by performing reset, exposure, and read-out for respective lines sequentially, the imaging device comprising:
   a reset unit that resets plural lines simultaneously, the reset unit including a line specifying unit that specifies the plural lines and a reset control unit that controls a reset of the specified lines based on a control signal indicating whether the specified lines should be reset;
   a control signal receiving unit that acquires the control signal, wherein the reset control unit controls the reset of the lines specified by the line specifying unit based on the acquired control signal;
   a control signal generating unit that evaluates a luminance value of respective lines in an image, which is imaged by the imaging device, for each of the lines and generates the control signal based on a result of the evaluation; and
   a control signal transmitting unit that causes the imaging device to acquire the generated control signal.

2. An imaging device according to claim 1, wherein the line specifying unit includes:
   a free-running counter that specifies the respective lines sequentially;
   a first line specifying unit that specifies a first line based on a line specified by the free-running counter and a first offset amount for setting a first exposure time; and
   a second line specifying unit that specifies a second line based on the line specified by the free-running counter and a second offset amount for setting a second exposure time that is shorter than the first exposure time.

3. An imaging device according to claim 1, wherein the reset control unit resets lines not forming an image.

4. An imaging device according to claim 1, further comprising:
   a readout line specifying unit that specifies at least one line;
   a readout control unit that controls readout of the specified lines; and
   an immediate reset unit that resets only lines, for which the readout is performed, among the specified lines immediately after the readout.

5. An imaging device according to claim 1, wherein the control signal generating unit includes:
   a code storing unit that stores codes indicating exposure time of the respective lines of the imaging device;
   a reset line specifying unit that specifies a line for which reset can be executed;
   a signal generating unit that reads out codes indicating exposure time of the lines specified by the line specifying unit and generates the control signal based on the read-out code; and
   a code updating unit that evaluates a luminance value of an image, which is imaged by the imaging device, based on the generated control signal and updates the codes of the respective lines stored in the storing unit based on a result of the evaluation.

6. An imaging apparatus that generates an image by imaging a first image with standard exposure time in one frame period and imaging a second image with a short exposure time that is shorter than the standard exposure time and replacing saturated pixels having a maximum luminance value in the first image with pixels in the second image, the imaging apparatus comprising:

an imaging device according to claim 1 that images the first image and the second image; and a short exposure time setting unit that sets, based on a saturation state of respective lines in the second image that has been imaged by the imaging device in a preceding frame period, a length of the short exposure time in a subsequent frame period for each of the lines.

* * * * *